March 9, 1965 P. H. PACAULT 3,172,258
NUCLEAR POWER PLANT
Original Filed Sept. 23, 1957 3 Sheets-Sheet 2

Inventor
Pierre Henri Pacault
By
Rennie, Edmonds, Morton, Barrows & Taylor
Attorneys March 9, 1965   P. H. PACAULT   3,172,258
NUCLEAR POWER PLANT
Original Filed Sept. 23, 1957   3 Sheets-Sheet 3
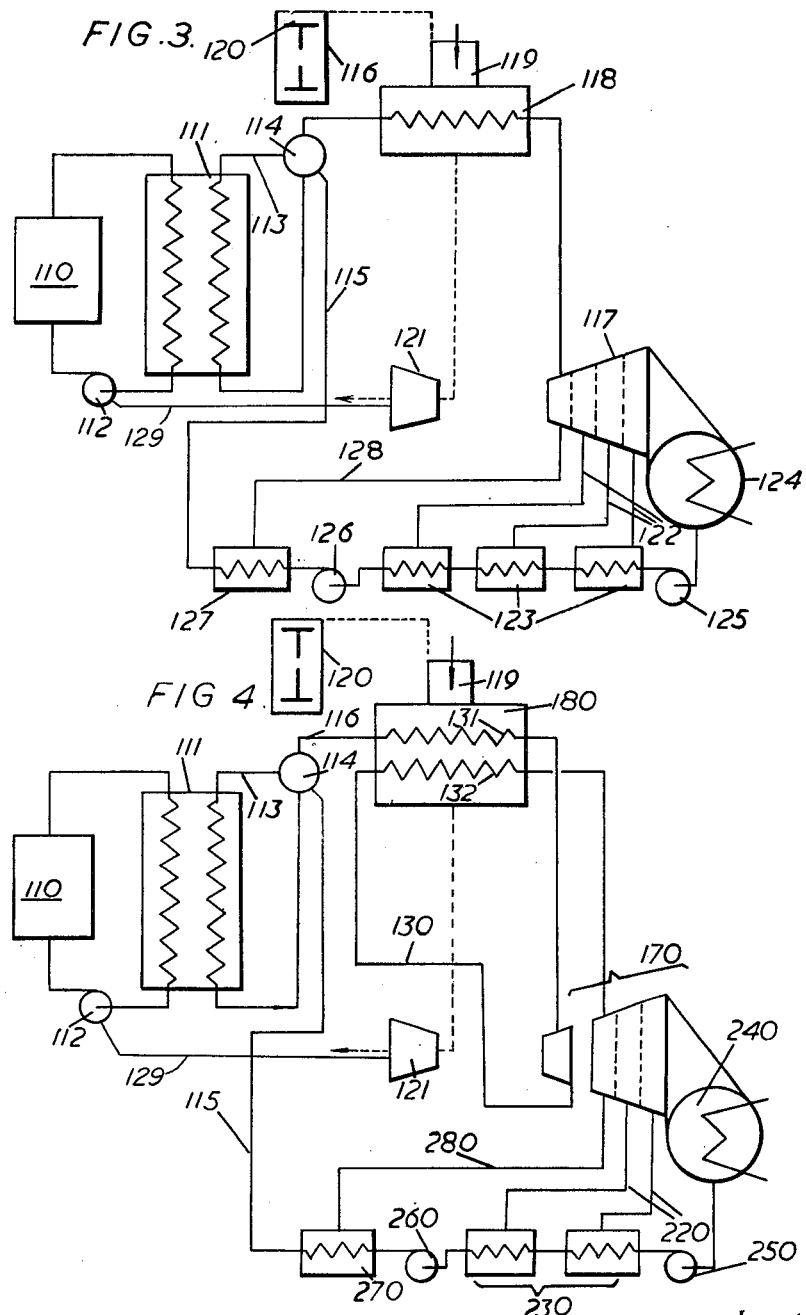
Inventor
Pierre Henri Pacault
By
Pennie, Edmonds, Morton, Barrows & Taylor
Attorneys

# United States Patent Office 3,172,258
Patented Mar. 9, 1965

3,172,258
NUCLEAR POWER PLANT
Pierre Henri Pacault, Paris, France, assignor to Babcock & Wilcox Limited, London, England, a corporation of Great Britain
Continuation of application Ser. No. 685,623, Sept. 23, 1957. This application Dec. 1, 1959, Ser. No. 856,610
Claims priority, application France, Sept. 21, 1956, 57,695, Patent 1,146,887
5 Claims. (Cl. 60—39.18)

This invention relates to power plants and is of particular use in connection with installations in which large quantities of heat at relatively low temperatures are available for heating and evaporating water or some other liquid and possibly for imparting a degree of superheat to the vapour generated. Sources of such heat are found in various furnaces, but the invention is of special importance in connection with nuclear reactors in which the coolant temperatures are limited to relatively low values.

This application is a continuation of my pending application Serial No. 685,623 filed September 23, 1957, now abandoned, which in turn was a continuation-in-part of my earlier application Serial No. 644,316, filed March 6, 1957, now abandoned.

An object of the invention is the provision of power plans having advantageous means for effecting vapour heating.

The present invention includes a power plant including a vapour generator arranged to supply vapour to a turbine and vapour heating means for heating vapour to be expanded in the turbine, wherein combustion means additional to the heat generating means of the vapour generator and adapted to operate under superatmospheric pressure are arranged to generate combustion gases and to supply the gases as heating fluid to the vapour heating means and as motive fluid to a gas turbine adapted to recover energy in the combustion gases.

The invention also includes power plant having a nuclear reactor, means for circulating a fluid medium to effect cooling of the reactor and heating of a vapour generator, a turbine connected to receive vapour from the vapour generator, vapour heating means for heating vapour to be expanded in the turbine, combustion means adapted to operate under superatmospheric pressure and arranged to supply combustion gases as heating fluid to the vapour heating means at a pressure of at least several atmospheres and as motive fluid to a gas turbine adapted to recover energy in the combustion gases.

If the heat exchanger is water cooled, a heat exchanger may be connected between the turbine connected to receive vapour from the vapour generator and the vapour generator so that exhaust recirculated from said turbine to the vapour generator passes through the heat exchanger, and this heat exchanger may be connected to the turbine so that the exhaust passing through the heat exchanger is heated by steam bled from said turbine.

The invention presents numerous advantages. Thus the superheat or/and resuperheat effected by the combustion gases can be controlled quite independently of the load on the vapour generator, so that the well-known difficulties experienced in maintaining superheat and resuperheat at low loads in conventional installations may be reduced or eliminated; the overall efficiency of power plant is notably increased, thanks to the highly efficient utilisation of the fuel supplied to the combustion means; the use of the combustion means in conjunction with the vapour heating means makes it possible to increase the number of reheats and consequently to approach more closely to the ideal of continuous reheat; when only one reheat is carried out, the resuperheater can be placed at the most favourable point in the thermal cycle, thanks to the fact that difficulties of losses of pressure and of installation of the pipework are eliminated or considerably reduced by the possibility of placing the vapour heating means in immediate proximity to the associated turbine; on starting up danger of overheating of the resuperheater does not arise since the combustion gases can by-pass the resuperheater.

The invention will now be described, by way of example, with reference to the accompanying diagrammatic drawings, in which:

FIGURE 3 shows an application of the invention to a power plant incorporating a water-cooled nuclear reactor; and FIGURE 4 shows an application of the invention to a modified form of the power plant illustrated in FIGURE 3.

Figure 1:
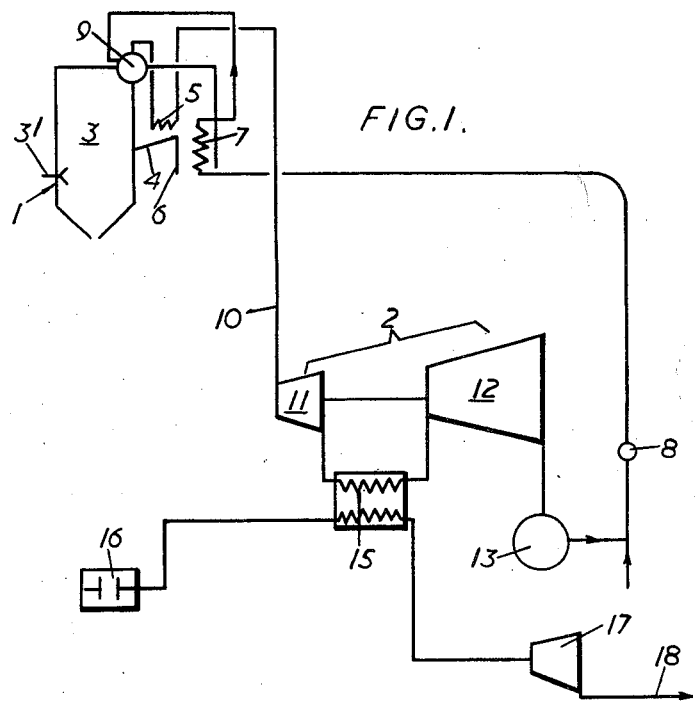
FIGURE 1 shows an application of the invention to a power plant of conventional form.

In FIGURE 1, the principal power producing means essentially comprise a steam generator 1 and a steam turbine 2. The steam generator comprises a combustion chamber 3 arranged to be fired with suitable fuel by burner means 3′, the walls of this chamber being lined in a known manner with steam generating tubes. The combustion gases leaving the chamber 3 pass into a lateral passage 4 containing a superheater 5, then into a downpass 6 containing an economiser 7. The feedwater supplied by a feed pump 8, is introduced, after having passed through the economiser 7, into a water and steam drum 9 which supplies water to the steam generating tubes through downcomer tubes in the usual manner. The saturated steam is superheated in the superheater 5 to be carried by a steam line 10 to the turbine 2, which includes a high pressure stage 11 and a low presusre stage 12. The exhaust steam of the low pressure stage 12 discharges to a condenser 13, the condensate passing to the feed pump 8.

Between the two stages 11 and 12 of the turbine and disposed in immediate proximity to it is a resuperheater 15. The heating fluid for the resuperheater 15 is supplied by a battery of compressors 16 of the free-piston type which will, for example, deliver gases at an absolute pressure of four atmospheres and a temperature of 425° C. In operation, these gases leave the resuperheater 15 at a practically unchanged pressure and at a temperature of 300° C., for example, and are admitted at that pressure and temperature into a gas turbine 17, in which they expand and are cooled to a temperature of 160° C., for example, the gases then being discharged to a duct 18 leading to the chimney of the installation.

Calculations show that the energy of the fuel burned in the gas cycle is utilised with an efficiency definitely greater than 40%. Apart from this advantage of efficiency, it should be noted that the desired temperature of reheat can be ensured even at very low rates of steam generation. Also, the reheat temperature can be regulated without any difficulty as the load of the steam turbine varies or during starting up thereof.

The resuperheater can be placed in immediate proximity to, for example, below, the steam turbine, so that the pipework necessary when a resuperheater is contained in a steam generator is eliminated. Reheat can be carried out at the most favourable pressure, seeing that pressure losses in pipework leading to and from the resuperheater are no longer to be feared. Also for resuperheating at different stages in the steam cycle several resuperheaters may be provided so that the ideal of continuous reheat is more closely approached.

If instead of using the gases supplied by the battery of free-piston compressors directly as the heating fluid, higher temperature heating fluid is desired, the gases may be supplied as combustion air to a combustion chamber in which suitable fuel can be burned. It is to be understood, also, that compression, in the gas cycle, can be effected by a compressor of any suitable type.

Figure 2:
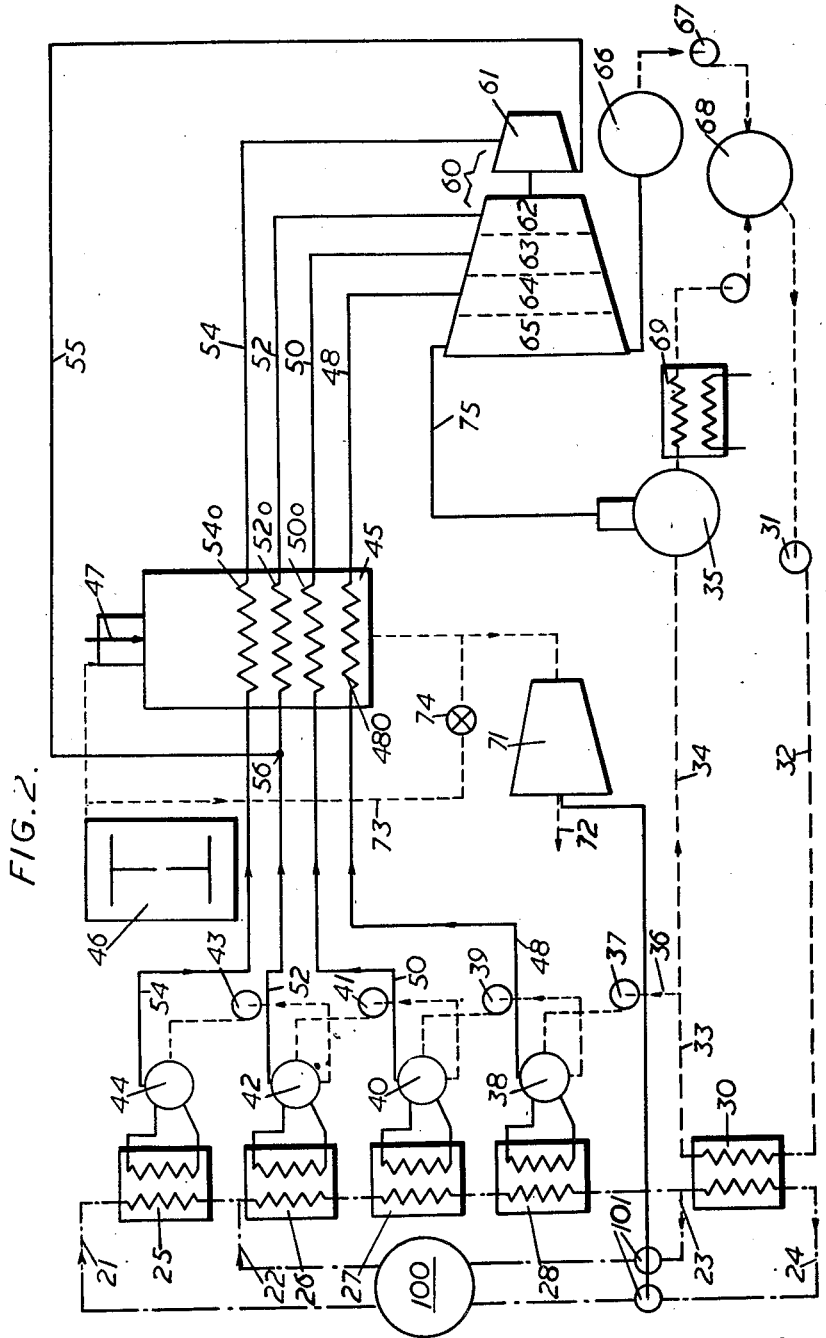
FIGURE 2 shows an application of the invention to a power plant incorporating a gas-cooled nuclear reactor.

In FIGURE 2, a fluid medium in the form of a gas, for example, carbon dioxide, is circulated, by circulating means in the form of blowers or pumps 101 driven by a gas turbine 71, as a coolant through a nuclear reactor 100 and as a heating fluid through a vapour generator including four heat exchangers or boilers 25, 26, 27 and 28 and a heat exchanger or economiser 30. The heat exchangers 25, 26, 27, 28 and 30 are disposed in series in a heating fluid path and the boilers 25, 26, 27 and 28 successively traversed by the heating fluid generate steam at progressively lower pressures. It will be appreciated that each boiler produces steam at a pressure which corresponds to the gas outlet temperature from the boiler. As a result, even with heating fluid of relatively low temperature, for example, of the order of 350° to 400° C., steam at a high pressure may be obtained with accompanying advantages as regards its use. As described below, the boilers are connected in series so far as the feedwater is concerned, each succeeding higher pressure boiler being fed with a proportion of the water from the preceding lower pressure boiler. In the particular arrangement illustrated, fluid at the highest temperature enters the boiler 25 through a duct 21 leading from the nuclear reactor and flows from the boiler 25 to the boiler 26, the fluid entering the boiler 26 being joined by hot fluid which is led through a duct 22 from the nuclear reactor and which is at a somewhat lower temperature than the fluid supplied through the duct 21. The combined stream of fluid from the ducts 21 and 22 flows in series through the boilers 26, 27 and 28. Some of the fluid flows from the boiler 28 through the economiser 30 and is returned to the nuclear reactor 100 through a duct 24. The remainder of the fluid discharged from the boiler 28 is returned to the nuclear reactor through a duct 23.

The boiler 25, through which the fluid of the highest temperature, for example, 355° C., passes generates steam at high pressure, for example, 70 atmospheres. The gases are cooled in the boiler 25 to a temperature approximately equal to that of the hot gases supplied through the duct 22, for example, 305° C., and, mixed with these gases, pass successively through the boilers 26, 27 and 28, which, for example, may respectively generate steam at 27 atmospheres, 12 atmospheres and 2.5 atmospheres. The economiser 30 ensures the cooling to a predetermined temperature, of 70° C., for example, of a predetermined fraction of the fluid, which leaves the boiler 28 at a temperature of 145° C. A feed pump 31 supplies the economiser 30 through a pipe 32 with the quantity of water necessary for effecting the desired cooling of the fluid discharged through the duct 24. The excess water is carried by an extension 34 of the economiser outlet pipe 33 to an expansion drum 35, whilst the feedwater necessary for the steam generator is supplied by a pipe 36 and a feed pump 37 to a water and steam drum 38 of the lowest pressure boiler 28. A part of this water is taken by a pump 39 and introduced into a water and steam drum 40 of the lower medium pressure boiler 27; a part of the water from the drum 40 is taken by a pump 41 and introduced into a water and steam drum 42 of the upper medium pressure boiler 26 and a part of the water from the drum 42 is taken by a pump 43 and introduced into a water and steam drum 44 of the high pressure boiler 25.

The saturated steam supplied at decreasing pressures by the drums 44, 42, 40 and 38, is taken by steam lines 54, 52, 50 and 48 respectively to the stages 61 to 64 of a steam turbine 60. In the lines 54, 52, 50 and 48 respectively are included superheaters 540, 520, 500 and 480 of steam heating means 45 in which the said superheaters are disposed in succession in a path for heating gases. The steam heating means 45 comprise a combustion chamber which is arranged to burn an appropriate fuel, for example, oil, introduced by a burner 47 and which is supplied with hot combustion air under pressure in the form of the exhaust gases from a battery 46 of free-piston compressors. The steam leaving the high pressure stage 61 of the turbine is led by a steam line 55 to the inlet 56 of the superheater 520 for the upper medium pressure steam and is supplied together with the latter steam, by the line 52, to the following stage 62 of the turbine 60. The turbine also includes a very low pressure, for example 0.5 atmosphere, stage 65 which utilises the saturated steam brought from the expansion drum 35 by a saturated steam line 75.

The steam discharged from the turbine 60 is condensed in a condenser 66 and the condensate is returned by an extraction pump 67 to a feed tank 68 to which water coming from the expansion drum 35 is also returned after passing through a cooler 69.

The flue gases having passed through the steam heating means 45 are expanded in a gas turbine 71 and then discharged through a duct 72 to a chimney (not shown).

As an alternative, the low pressure superheater 480, and possibly also the lower-medium pressure superheater 500, may be placed in the path of the heating gases after the gas turbine 71, it being possible to allow admission to the gas turbine of gases at a relatively high temperature of 500° to 550° C., for example.

Now in the power plant described with reference to FIGURE 2, the coolant gas is driven through the reactor 100 by means of pumps 101 and it is necessary, in order to minimise the pumping energy absorbed by the blowers and therefore wasted, to ensure that the temperature of the gases entering the pumps is as low as possible. Since the temperature of the coolant gas is reduced by heat exchange with the condensed exhaust from the turbine, it is necessary that the condensed exhaust should be brought to as low a temperature as possible before exchanging heat with the coolant gas even though the heat extracted from the exhaust in cooling it is largely or wholly wasted.

Although the power plant illustrated in FIGURE 2 has been described as having a gas cooled reactor, it can, in fact, also be used if the coolant is water. However, in contrast to gas, the energy required to pump water through the reactor is largely independent of the temperature of the water so that cooling the condensed exhaust from the turbine wastes heat energy unnecessarily. The power plants illustrated in FIGURES 3 and 4 avoid wasting energy in this way and are, indeed, arranged to recirculate the condensed exhaust from the turbine to the heat generating means in which it absorbs heat from the reactor coolant at a temperature approaching its boiling temperature.

In FIGURE 3, a boiling water pile 110 is cooled by water circulated by means of the pump 112. After passing through the pile, the water passes through a heat exchanging vapour generator 111 and returns to the pump 112 for recirculation.

In the heat exchanger 111, the coolant heats to steam, water supplied from a water drum 114. The steam emerges through the steam zone of the drum 114 into the conduit 116 leading to the heater 118 in which the steam is superheated. The heater 118 comprises a combustion chamber which is arranged to burn an appropriate fuel, for example, oil, introduced by a burner 119 and which is supplied with hot combustion air at superatmospheric pressure in the form of the exhaust gases from a battery 120 of free-piston compressors.

The combustion gases leaving the heater 118 pass to the gas turbine 121 in which they expand so that energy is usefully recovered from them, the energy being used to drive the pump 112 through the connection 129.

Superheated steam leaving the heater 118 passes to the four stage turbine 117 which is of a conventional type. Exhaust from the turbine 117 is condensed in the condenser 124 and the condensed water is driven by pump 125 through the three heat exchangers 123 in turn to the pump 126. This pump 126 drives the condensed water through the high pressure heat exchanger 127 into the conduit 115 whence it enters the water drum 114. The three heat exchangers 123 are connected by bleed pipes 122 to the last three stages of the turbine 117, the heat exchanger through which the condensate passes first being connected to the coolest stage and the other two heat exchangers to progressively hotter stages, whilst the exchanger 127 is connected by the bleed pipe 128 to the first stage of the turbine 117. Water returning from the condenser 124 to the heat exchanger 111 therefore passes successively through heat exchangers of increasing temperatures so that it reaches the heat exchanger 111 at a temperature very close to boiling temperature.

The number of bleedings taken from the turbine 117 can be greater or less than four depending upon the construction of the power plant and the method in which it is to be operated. The advantage of bleeding steam is that the bled steam is used more efficiently than the steam passing to exhaust from the end of the turbine since the heat of condensation of the bled steam is utilised. The efficiency with which steam entering the turbine and being bled off into a heat exchanger is used may be as high as 80% whereas the efficiency with which steam entering the turbine and passing through it to exhaust may be no greater than 30%.

The apparatus so far described is especially suitable for use when the pressure to which the superheated steam can be raised must be limited to a rather low value, 30–40 atmospheres, for instance. If the temperature to which such steam is raised is of the order of 550° C., the conditions existing are comparable to those in the low pressure part of modern thermal power stations producing power of the order of one hundred thousand kilowatts. The steam can expand through the turbine without reaching an intolerable degree of wetness to a pressure at which it is appropriate for it to be condensed. If, however, superheater pressures of the order of 100 atmospheres can be achieved at a temperature of 550° C., it is desirable to reheat the steam after expansion to a pressure of the order of 30 atmospheres to avoid wetness of the steam. The power plant shown in FIGURE 4 indicates how the apparatus of FIGURE 3 is modified for use with steam at the higher pressure.

In this plant steam emerges from the steam drum 114 at pressures of 100 to 150 atmospheres and flows through the conduit 131 of the heater 180 in which it is superheated and its temperature is raised to the order of 550° C. From the heater 180 it is conveyed to stage I of the turbine 170 and emerges at a pressure of about 30 atmospheres. It is led to the heater 180 by the steam line 130 and through the heater 180 by the conduit 132. In passing through the heater 180 the steam is reheated and its temperature is restored to 550° C. From the heater 180 it passes through stages II, III, IV of the turbine 170. In the power plant illustrated in FIGURE 4, bleeding is made only from stages II, III and IV of the turbine. The condensate from the condenser 240 is passed by pump 250 serially through the heat exchangers 230 heated by steam bled from stages III and IV respectively. From these heat exchangers, the feed water is pumped by the pump 260 through the high pressure heat exchanger 270 heated by steam bled from the turbine stage 2 through the passage 280.

In complex installations constituted in the manner described, the heat available in the conventional fuel or fuel burned in the battery 46 in FIGURE 2, or 120 in FIGURES 3 and 4 of free-piston compressors and in the combustion chamber of the steam heating means 45 in FIGURE 2, 119 in FIGURE 3 or 180 in FIGURE 4 is used with an efficiency considerably higher than that which is obtained in the most modern installations. It may be said that this efficiency of conventional fuel utilisation is the higher, the higher the superheat temperature. One could, therefore, envisage superheat in two stages, the primary superheat being assured by the heat of nuclear origin, the secondary superheat by the conventional fuel. By reason of the high temperature at which the gases would in this case arrive at the gas turbine, it would, however, be necessary to ensure in the latter a pressure ratio sufficient to avoid a large loss of sensible heat at the chimney.

Under present conditions and certainly for some years to come, unless the metallurgy of the materials entering into the manufacture of atomic reactors makes very extensive and very rapid progress, the temperature of the cooling fluids of reactors is limited to the order of 375° C.–400° C. In these circumstances, it is the combination of gas and steam cycles which makes it possible to obtain the best efficiencies. The possible efficiency is increased still further when the reactor is water cooled since not only are the benefits resulting from combining gas and steam cycles obtained, but the coolant can be circulated at a temperature quite close to its boiling point so that some of the losses usually resulting from condensing the exhaust are avoided. It might in fact also be considered that a gas cycle alone could be used for the recovery of the heat liberated by atomic reactors and the transformation of such heat into mechanical energy, but such a cycle could have a good efficiency only if the temperature of the source of heat could reach a value of the order of 600° C., which is not compatible with present atomic piles.

It is to be understood that compression of the gases supplied to the gas turbine may be effected by a compressor of any suitable type. When the battery of free-piston compressors is used, the compressors are necessarily fed with oil, but their consumption of oil remains low in comparison with the consumption of conventional fuel, which can be of any nature such as gas and even coal, in the combustion chamber of the steam heating means. In FIGURE 2, the use of oil has been envisaged also for firing the combustion chamber of the steam heating means 45. The efficiency with which oil works in such an installation is certainly greater than 40%. Oil could also be used for firing the combustion chambers of the steam heating means 120 in FIGURES 3 and 4.

Attention should be drawn to the very interesting possibilities which installations offer such as have been described with reference to FIGURES 2, 3 and 4 from the point of view of safety and starting up. It is in fact necessary, in order to prevent deterioration, to ensure cooling of the reactor for a certain time after it has been suddenly stopped. In the present atomic power stations, such cooling necessitates special and complex apparatus. In the case of the installation described, on starting up or after a general shut down, it is always possible to ensure the functioning of a part, if not of the whole, of the blowers effecting the circulation of the coolant of the reactor, if these blowers are driven by the gas turbine, a machine which is particularly sure both in its functioning and in its supply of motive fluid derived from a number of free-piston compressors working in parallel. If care is taken to design the gas turbine, both mechanically and from the point of view of the materials used in its construction it will be possible to demand a substantial degree of overload from the machine, if a relatively high loss of sensible heat at the chimney is accepted. For example, as is indicated in FIGURE 2, by fitting a by-pass 73 controlled by a valve 74 between the battery 46 of compressors and the gas turbine 71, it is possible, in case of need, to short-circuit the steam heating means 45 and to admit the whole of the gases from the compressors directly into the gas turbine at a temperature of the order of 500° C. instead of 300° C., for example. The overload would then be of the order of 30%. The free-piston generators are also capable of a certain overload and as, in addition, there is always at least one of them in reserve, the total available overload may be particularly large.

What is claimed is:

1. Power plant having a nuclear reactor, means defining a coolant circuit for the nuclear reactor, fluid circulating means for circulating a fluid medium as a reactor coolant through the circuit, vapour generating means arranged to receive heat from the fluid medium circulating in said circuit, a vapour turbine, vapour supply means leading from the vapour generating means to the said turbine, a generator of hot combustion gases under superatmospheric pressure, means defining a combustion gas discharge path leading from the generator of hot combustion gases, vapour heating means arranged to heat the vapour to be expanded in the vapour turbine and disposed in the said path, a gas turbine also disposed in said path downstream from said vapour heating means to receive the said combustion gases as motive fluid, and coupling means connecting the gas turbine in driving relationship to the fluid circulating means.

2. Power plant having a nuclear reactor, means defining a coolant circuit for the nuclear reactor, fluid circulating means for circulating a fluid medium as a reactor coolant through the circuit, vapour generating means arranged to receive heat from the fluid medium circulating in said circuit, a vapour turbine, vapour supply means leading from the vapour generating means to the said turbine, a generator of hot combustion gases under superatmospheric pressure, means defining a combustion gas discharge path leading from the generator of hot combustion gases, vapour heating means arranged to heat the vapour to be expanded in the vapour turbine and disposed in the said path, a gas turbine also disposed in said path downstream from said vapour heating means to receive the said combustion gases as motive fluid, means forming a gas by-pass to said vapour heating means and a valve in the by-pass enabling combustion gases in flowing from the generator of hot gases to the gas turbine to by-pass said vapour heating means and coupling means connecting the gas turbine in driving relationship to the fluid circulating means.

3. Power plant having a nuclear reactor, means defining a coolant circuit for the nuclear reactor, fluid circulating means for circulating a fluid medium as a reactor coolant through the circuit, vapour generating means arranged to receive heat from the fluid medium circulating in said circuit, a vapour turbine, vapour supply means leading from the vapour generating means to the said turbine, a generator of hot combustion gases under superatmospheric pressure including compressor means of the free-piston type, means defining a combustion gas discharge path leading from the generator of hot combustion gases, vapour heating means arranged to heat the vapour to be expanded in the vapour turbine and disposed in the said path, a gas turbine also disposed in said path downstream from said vapour heating means to receive the said combustion gases as motive fluid and coupling means connecting the gas turbine in driving relationship to the fluid circulating means.

4. Power plant comprising a nuclear reactor, means defining a circuit through which water can be passed to cool the reactor, water circulating means for circulating water through the circuit, vapour generating means arranged to receive heat from the water circulating in said circuit, a vapour turbine, vapour supply means leading from the vapour generating means to the said turbine, exhaust return means leading exhaust from the turbine back to the vapour generating means, a heat exchanger thorugh which exhaust is led by the exhaust return means, a bleed line connected between the turbine and the heat exchanger to bring vapour from the turbine into heat exchanging relation with the exhaust, a generator of hot combustion gases under superatmospheric pressure, mean defining a combustion gas discharge path leading from the generator of hot combustion gases, vapour heating means arranged to heat the vapour to be expanded in the vapour turbine and disposed in the said path, a gas turbine also disposed in the said path downstream from said vapour heating means to receive the said combustion gases as motive fluid and coupling means connecting the gas turbine in driving relationship to the water circulating means.

5. Power plant comprising a nuclear reactor, means defining a circuit through which water can be passed to cool the reactor, water circulaing means for circulating water through the circuit, vapour generating means arranged to receive heat from the water circulating in said circuit, a vapour turbine, vapour supply means leading from the vapour generating means to the said turbine, exhaust means leading exhaust from the turbine back to the vapour generating means, a heat exchanger through which exhaust is led by the exhaust return means, a bleed line connected between the turbine and the heat exchanger to bring vapour from the turbine into heat exchanging relation with the exhaust, a generator of hot combustion gases under superatmospheric pressure including compressor means of the free-piston type, means defining a combustion gas discharge path leading from the generator of hot combustion gases, vapour heating means arranged to heat the vapour to be expanded in the vapour turbine and disposed in the said path, a gas turbine also disposed in the said path downstream from said vapour heating means to receive the said combustion gases as motive fluid and coupling means connecting the gas turbine in driving relationship to the water circulating means.

References Cited in the file of this patent

UNITED STATES PATENTS

| | | |
|---|---|---|
| 2,568,787 | Bosch | Sept. 25, 1951 |
| 2,697,548 | Janicke | Dec. 21, 1954 |
| 2,746,670 | Huber | May 22, 1956 |
| 2,957,815 | Pacault et al. | Oct. 25, 1960 |
| 2,988,874 | Ray et al. | June 20, 1961 |

FOREIGN PATENTS

| | | |
|---|---|---|
| 679,083 | Great Britain | Sept. 10, 1952 |